US009226456B2

(12) United States Patent
Nelson et al.

(10) Patent No.: US 9,226,456 B2
(45) Date of Patent: Jan. 5, 2016

(54) METHODS AND APPARATUS FOR VERTICAL HANGING PLANT CONTAINER

(71) Applicant: Woolly Pocket Corporation, Los Angeles, CA (US)

(72) Inventors: Miguel E. Nelson, Los Angeles, CA (US); Sherry L. Walsh, Los Angeles, CA (US); Rodney L. Nelson, Phoenix, AZ (US)

(73) Assignee: Woolly Pocket, LLC, North Kansas City, MO (US)

( * ) Notice: Subject to any disclaimer, the term of this patent is extended or adjusted under 35 U.S.C. 154(b) by 23 days.

(21) Appl. No.: 13/740,487

(22) Filed: Jan. 14, 2013

(65) Prior Publication Data

US 2013/0125459 A1 May 23, 2013

Related U.S. Application Data

(63) Continuation-in-part of application No. 13/066,950, filed on Apr. 28, 2011, now Pat. No. 8,567,122, which is a continuation-in-part of application No. PCT/US2010/000743, filed on Mar. 10, 2010.

(60) Provisional application No. 61/336,985, filed on Jan. 29, 2010, provisional application No. 61/209,768, filed on Mar. 10, 2009.

(51) Int. Cl.
*A01G 9/02* (2006.01)
*A01G 9/10* (2006.01)

(52) U.S. Cl.
CPC *A01G 9/022* (2013.01); *A01G 9/02* (2013.01); *A01G 9/025* (2013.01); *A01G 9/1006* (2013.01)

(58) Field of Classification Search
CPC ......... A01G 9/02; A01G 27/02; A01G 27/06; A01G 9/022; A01G 9/023
USPC .................... 47/67, 79, 81, 83, 82, 65.6, 48.5
IPC ................................ A01G 27/00, 27/02, 27/06
See application file for complete search history.

(56) References Cited

U.S. PATENT DOCUMENTS

| 1,317,569 | A | * | 9/1919 | Forster | 47/79 |
| 2,514,269 | A | * | 7/1950 | Wilberschied | 47/81 |
| 3,243,919 | A | * | 4/1966 | Carlson | 47/79 |
| 3,857,934 | A | | 12/1974 | Bernstein et al. | |
| 4,077,511 | A | * | 3/1978 | Mosijowsky | 206/0.5 |
| 4,115,951 | A | * | 9/1978 | Becker et al. | 47/81 |
| 4,142,324 | A | * | 3/1979 | Magyar, Jr. | 47/75 |

(Continued)

FOREIGN PATENT DOCUMENTS

FR 470151 * 3/1914

*Primary Examiner* — Shadi Baniani
*Assistant Examiner* — Magdalena Topolski
(74) *Attorney, Agent, or Firm* — The Noblitt Group, PLLC

(57) ABSTRACT

Methods and apparatus for vertical hanging plant container according to various aspects of the present invention comprise a container comprising a moisture impermeable reservoir and an air and moisture permeable zone. The reservoir may be disposed along a bottom section of the container to serve as a moisture storage region allowing moisture to be wicked upwards by the soil in the container. The air and moisture permeable zone may be located above the reservoir in at least one sidewall of the container and allow for the transfer of air and moisture between the soil and an exterior environment surrounding the container.

5 Claims, 13 Drawing Sheets

(56) References Cited

U.S. PATENT DOCUMENTS

| | | | |
|---|---|---|---|
| D255,010 S * | 5/1980 | Boller | D9/427 |
| 4,439,950 A | 4/1984 | Kelley | |
| 4,557,070 A * | 12/1985 | Oyama | 47/80 |
| 5,099,603 A * | 3/1992 | Rigsby | 47/48.5 |
| 5,107,621 A * | 4/1992 | Deutschmann, Sr. | 47/79 |
| 5,852,896 A * | 12/1998 | Flasch, Jr. | 47/79 |
| 6,219,969 B1 * | 4/2001 | Dion | 47/79 |
| D485,207 S * | 1/2004 | Dion | D11/143 |
| 6,766,817 B2 | 7/2004 | da Silva | |
| 6,971,205 B2 * | 12/2005 | Woodruff | 47/65.5 |
| 2003/0167688 A1 * | 9/2003 | Atchley et al. | 47/73 |
| 2004/0200141 A1 | 10/2004 | Whitcomb | |
| 2005/0166451 A1 | 8/2005 | Stachnik | |
| 2006/0059775 A1 | 3/2006 | L'Estrange | |
| 2007/0269275 A1 | 11/2007 | Kimberlin | |
| 2009/0020446 A1 | 1/2009 | Frankenstein et al. | |
| 2009/0300984 A1 * | 12/2009 | Gordon | 47/66.7 |
| 2014/0069000 A1 * | 3/2014 | Balestra et al. | 47/48.5 |

\* cited by examiner

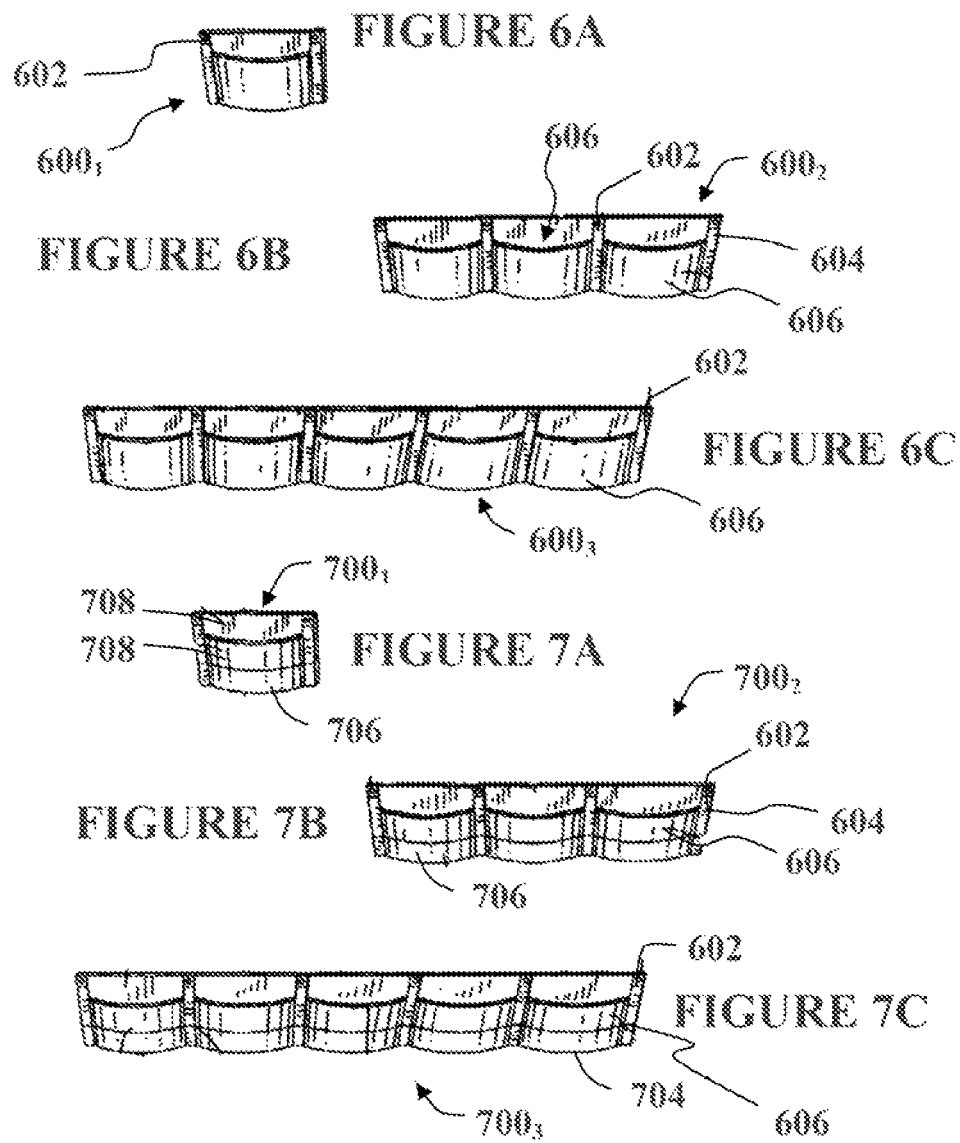

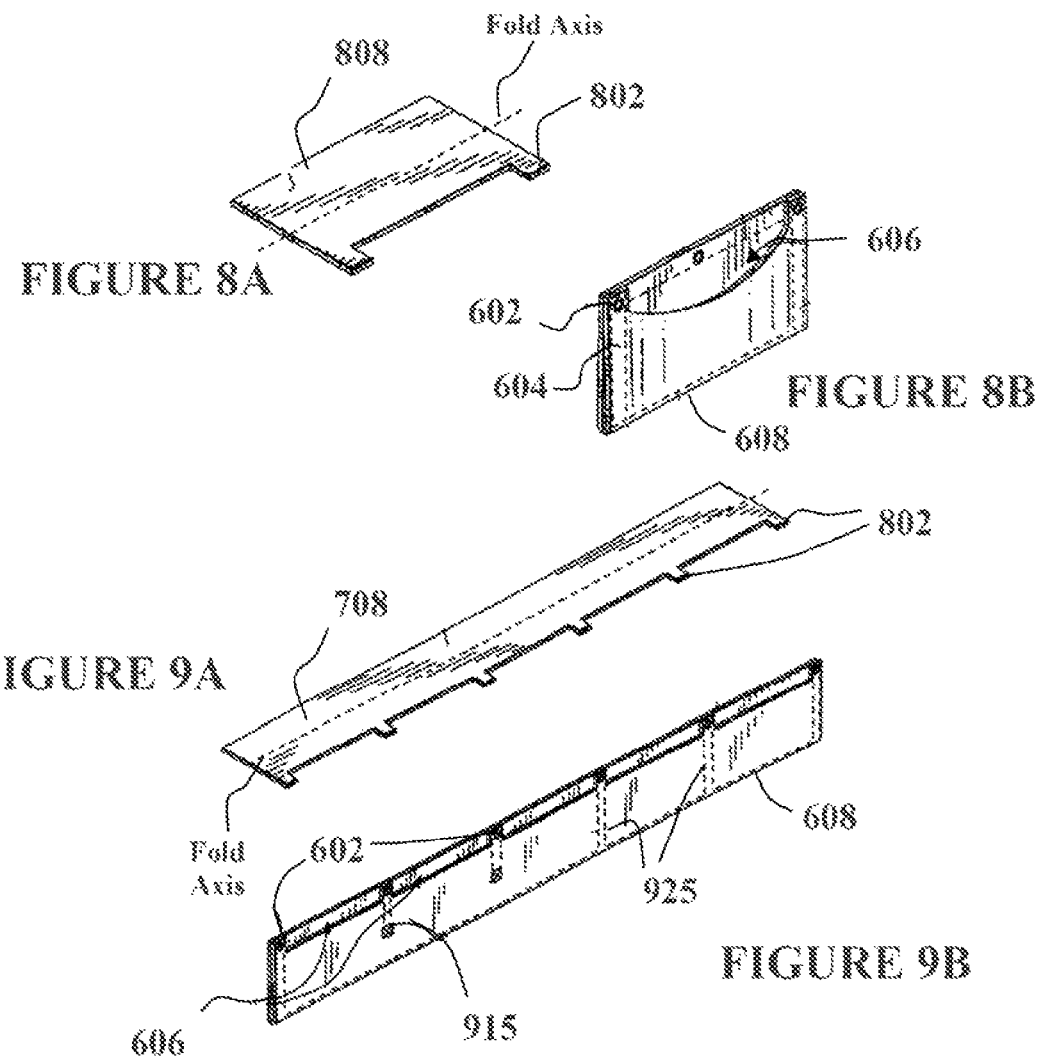

METHODS AND APPARATUS FOR
VERTICAL HANGING PLANT CONTAINER

CROSS-REFERENCES TO RELATED APPLICATIONS

This application is a Continuation-in-part of application of U.S. application Ser. No. 13/066,950 filed Apr. 28, 2011 which is a Continuation-in-part of International Application No. PCT/US2010/00743 filed on Mar. 10, 2010, and claims the benefit of U.S. Provisional Patent Application No. 61/209,768 filed Mar. 10, 2009, and U.S. Provisional Patent Application No. 61/336,985 filed Jan. 29, 2010 and incorporates the disclosure of each application in its entirety by reference.

BACKGROUND OF INVENTION

Plants are commonly grown out of the ground in various types of containers including clay and plastic pots and containers comprised of flexible materials hung from various surfaces. Containers that use micro-porous films may transmit air, gas, and vapor, but can still act as a barrier to water. Impermeability of some materials to air, moisture, and water may damage long-term plant health, especially where the amount of soil held by the container is small. For example, micro-porous materials may not allow water to permeate the container fast enough and result in overexposing the plant to moisture, which can cause rotting of the plant roots. However, over longer time periods, the lack of a water impermeable layer can eventually result in the micro-porous material allowing condensation to seep through the bottom and sidewalls of the container, since it is not absorbent enough to provide condensation protection. One solution to this problem has been to place a hole or opening at the bottom of the container to allow excess water to escape. However, when a container is overwatered, the hole also allows soil and/or nutrients within the soil to escape along with the excess water. Further, the escaping water may cause damage and/or create an undesired situation to surrounding areas.

SUMMARY OF THE INVENTION

Methods and apparatus for vertical hanging plant container according to various aspects of the present invention comprise a container comprising a moisture impermeable reservoir and an air and moisture permeable zone. The reservoir may be disposed along a bottom section of the container to serve as a moisture storage region allowing moisture to be wicked upwards by the soil in the container. The air and moisture permeable zone may be located above the reservoir in at least one sidewall of the container and allow for the transfer of air and moisture between the soil and an exterior environment surrounding the container.

BRIEF DESCRIPTION OF THE DRAWINGS

A more complete understanding of the present invention may be derived by referring to the detailed description when considered in connection with the following illustrative figures. In the following figures, like reference numbers refer to similar elements and steps throughout the figures.

FIGS. 6A-6C representatively illustrate perspective views of a flexible hanging planter shown in three variations, where FIG. 6A is a single plant hanger. FIG. 6B is a triple plant hanger, and FIG. 6C is a quintuple plant hanger;

FIGS. 7A-7C representatively illustrate perspective views of three vertically mountable multi-ply flexible hanging planter embodiments, each with an impermeable material layer therein; and where FIG. 7A is a single plant hanger, FIG. 7B is a triple plant hanger, and FIG. 7C is a quintuple plant hanger;

FIGS. 8A and 8B represents a flow diagram of a method for fabricating the vertically mountable single-ply hanging planter having a single pouch:

FIGS. 9A and 9B represents a flow diagram of a method for fabricating the vertically mountable single-ply hanging planter having multiple pouches;

Figure 1:
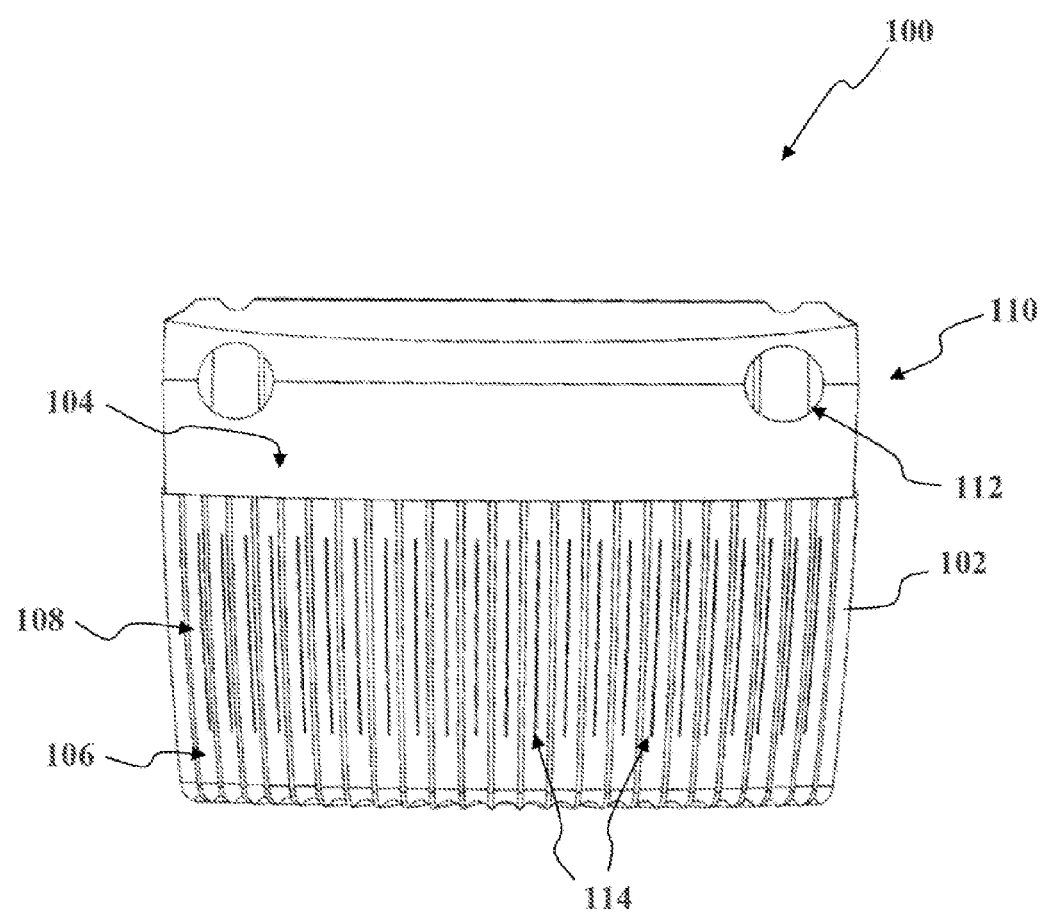
FIG. 1 representatively illustrates a front view of a planter in accordance with an exemplary embodiment of the present invention.

To facilitate understanding of the invention, identical reference numerals have been used, when appropriate, to designate the same or similar elements that are common to the figures. Further, unless stated otherwise, the drawings shown and discussed in the figures are not drawn to scale, hut are shown for illustrative purposes only.

DETAILED DESCRIPTION OF EXEMPLARY EMBODIMENTS

The present invention relates to a plant container and hanging planter comprising a breathable sidewall and a water retaining section. More specifically the present invention relates to a hanging planter that may be formed as a vessel for retaining plants in a substantially vertical position, such as being mounted, hung, or otherwise coupled to a wall or ceiling. The present invention may be described in terms of functional block components and various processing steps. Such functional blocks may be realized by any number of components configured to perform the specified functions and achieve the various results. For example, the present invention may employ various types of materials, fasteners, ducting, storage containers, and the like, which may carry out a variety of functions. In addition, the present invention may be practiced in conjunction with any number of processes such as garden planting, plant training, decorating, and the system described is merely one exemplary application for the invention.

Figure 2:
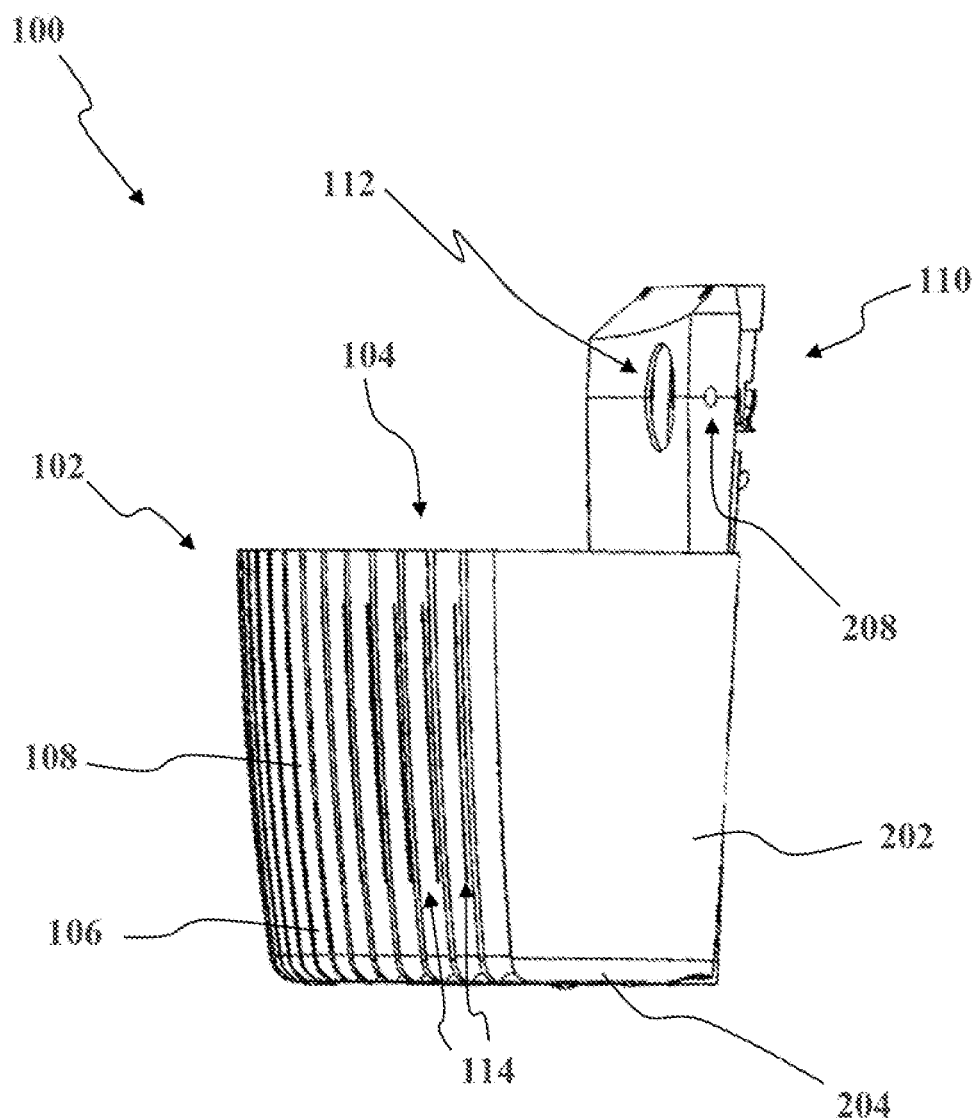
FIG. 2 representatively illustrates a side view of the planter in accordance with an exemplary embodiment of the present invention.
Figure 3:
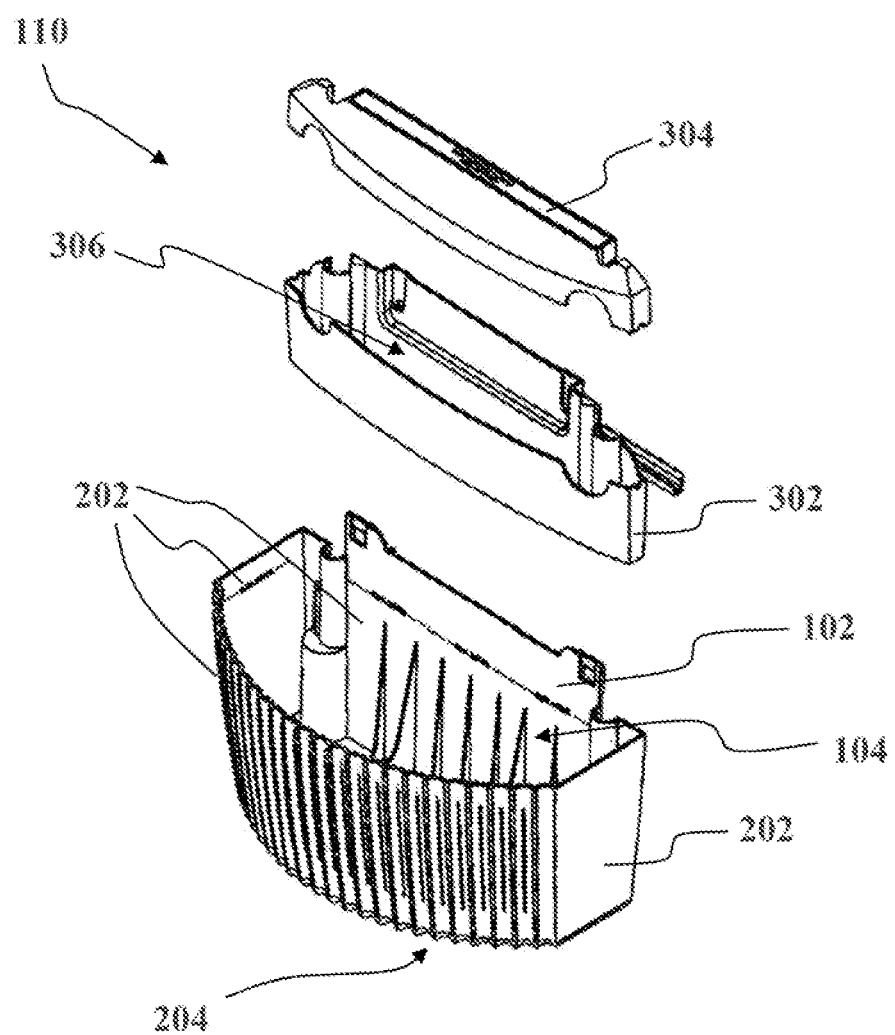
FIG. 3 representatively illustrates a top front perspective view of the planter and a water dispersal unit in accordance with an exemplary embodiment of the present invention.
Figure 4:
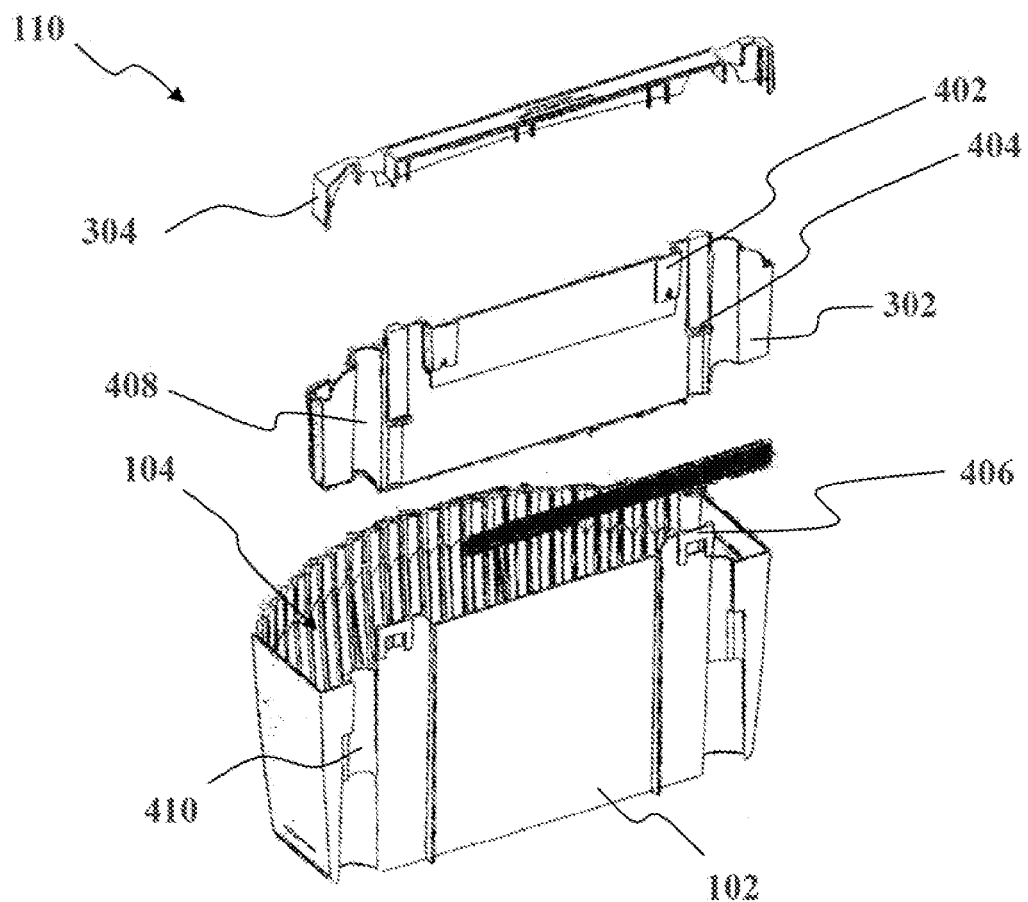
FIG. 4 representatively illustrates a rear perspective view of the planter and the water dispersal unit in accordance with an exemplary embodiment of the present invention.

Referring now to FIGS. 1 and 2, in one embodiment, methods and apparatus for vertical hanging planter 100 may comprise a container 102 configured with an open interior 104 divided into a moisture reservoir 106 and a breathable zone 108. The planter 100 may further comprise a water distribution unit 110 coupled to the container 102 for receiving and dispersing water to the open interior 104.

The container 102 may be configured to receive and store a plant and any additional elements such as soil, rock, compost, mulch, and the like. The container 102 may comprise any suitable device or structure for containing a plant. For example, in one embodiment, the container may comprise a rigid or semi-rigid body having a base 204 and one or more sidewall elements 202 arranged around the peripheral edges of the base 204 and extending upwards to form the open interior 104. The sidewall elements 202 may be coupled to the base and/or each other by any suitable method such as mechanically fastened, adhesively bonded, welded, or the like. Alternatively, the sidewall elements 202 and the base 204 may be formed as a single unit such as from a molding or extrusion process.

The base 204 and sidewall elements 202 may comprise any suitable material such as plastic, wood, metal, or composite. For example, in one embodiment, the sidewall elements 202 and the base 204 may comprise a molded plastic. The sidewall elements 202 and the base 204 may also be configured to be resistant to various environmental elements such as moisture penetration and ultraviolet exposure. The sidewall elements 202 and the base 204 may also be suitably adapted to be exposed to temperatures of between −20° F. to 170° F. without suffering any structural damage.

The container 102 may further comprise a mounting system suitably configured to allow the container 102 to be selectively coupled, connected, or otherwise attached to a vertical surface such as a wall and/or fence. The mounting system may comprise any system or device for connecting the container 102 to another object. For example, in one embodiment, the mounting system may comprise one or more recesses, notches, or holes configured to couple to a coupling device such as a hook, nail, screw, bolt, or tab.

The mounting system may be disposed directly on the container 102 or it may be suitably configured to be coupled between the container 102 and the mounting surface. For example, the mounting system may comprise a device configured to be permanently or semi-permanently affixed to the vertical surface and allow the container 102 to be selectively coupled to or decoupled from the mounting system.

Referring now to FIGS. 6A-6C, in an alternative embodiment, the container 600 may comprise a flexible geo-textile such as recycled polyester needle-punched felt. Alternatively, the container 600 may comprise both a flexible geo-textile and a flexible, durable, impermeable, water retaining material such as the rubber, vinyl, or plastic sheet material. For example, referring now to FIG. 10, the container 1000 may comprise a first exterior layer 1002 fabricated from a flexible geo-textile material and a second interior layer 1006 fabricated from the geo-textile material wherein the second interior layer 1006 is positioned adjacent to the first exterior layer 1002 and fastened along a periphery of the first exterior 1002 and second interior layers 1006. The first exterior layer 1002 may form an exterior portion of the container 1000 and the second interior layer 1006 may form an interior portion of the container 1000.

Referring now to FIGS. 6A-6C, 7A-7C, 9, and 13B the planter may be fabricated with one or more pouches such as the single hanging planter shown in FIG. 6A and FIG. 7A, triple plant hangers as shown in FIGS. 6B and 7B, and quintuple plant hangers as shown by FIGS. 6C and 7C. Each of these embodiments may also comprise a fastening or mounting system. For example, the mounting system may comprise one or more grommets 602 formed in a back portion of the planters to permit die mounting or attachment to various vertical structures such as walls and fences.

The moisture reservoir 106 may be configured to store moisture for use by the plant over time. The moisture reservoir 106 may store moisture by any suitable system or method such as by collecting excess moisture into a pool, sponge, or the like. Referring again to FIGS. 1 and 2, the moisture reservoir 106 may be disposed along a lower portion of open interior 104 of the container 102. For example, in one embodiment the moisture reservoir 106 may comprise a moisture impermeable zone extending upwards a predetermined distance from the base 204 of the container 102 to form a volume capable of storing moisture. The volume formed by the moisture reservoir 106 may be determined, at least in part, by the distance the breathable zone 108 is separated from the base 204 of the container 102.

Figure 10:
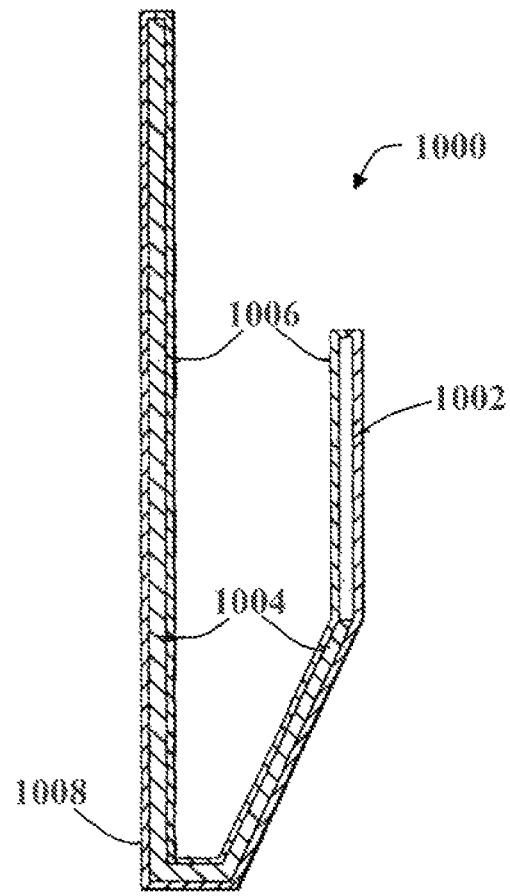
FIG. 10 is a cross-sectional view of a vertically mountable 3-ply plant hanger.
Figures 14, 15:
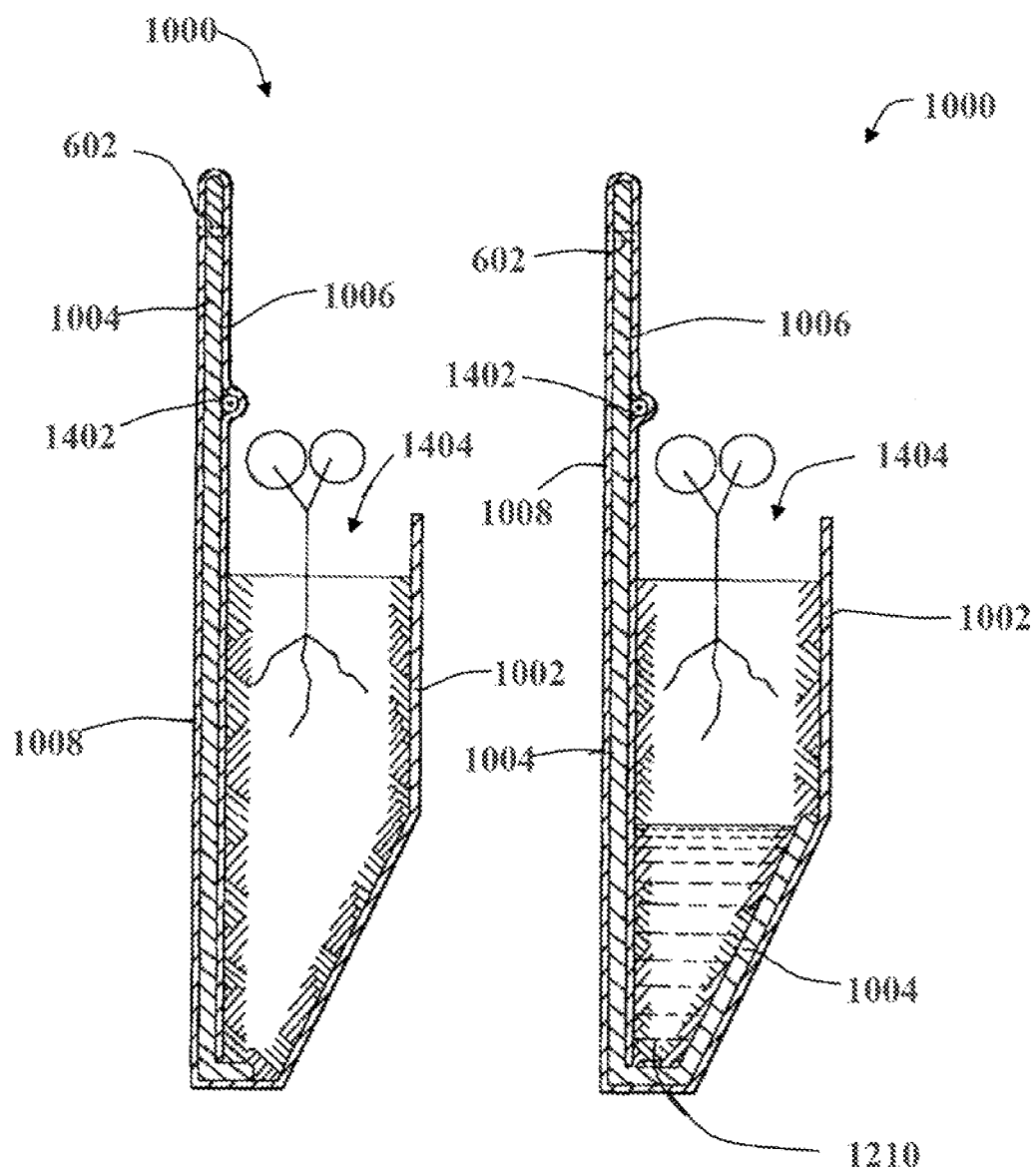
FIG. 14 is a cross-sectional view of another embodiment of the vertically mountable hanging planter illustrating an interior fabric liner that wicks moisture to and from the plant soil.
FIG. 15 is a cross-sectional view of yet another embodiment of the vertically mountable hanging planter Illustrating a water-impermeable layer that forms a reservoir at the bottom of the pouch of the hanging planter.

Referring now to FIGS. 10 and 15, in an alternative embodiment, the flexible container 1000 may further comprise a water impermeable flexible material 1004 inserted between the first exterior layer 1002 and the second interior layer 1006 to define the moisture impermeable zone. The water impermeable flexible material 1004 may have a height less than the first exterior layer 1002 and the second interior layer 1006; the 3-ply panel being folded over itself to define a 3-ply front portion and 3-ply rear portion of the plant hanger, the rear portion and a lower section of the front portion including the water impermeable flexible material, and an upper section of the front portion being 2-plies formed by the first exterior and second interior layers, wherein opposing lateral sides of the rear panel and front panel are fastened together to form at least one pouch.

The breathable zone 108 may be permeable to air and/or water allowing soil in the container 102 to be aerated, air-born nutrients to pass to the roots, inhibit, mold growth, and provide for air pruning of the plant root system. The breathable zone 108 may allow air and/or moisture to migrate between the interior 104 of the container 102 and an area surrounding the container 102 by any suitable method. Referring again to FIGS. 1 and 2, in one embodiment the breathable zone 108 may comprise an opening disposed in at least one sidewall element 202. The opening may comprise any size or shape suitable for allowing air and/or moisture to migrate between the soil and the surrounding environment. For example, in one embodiment, the opening may comprise a one or more vertical slits 114 in a forward facing sidewall element 202 extending between the moisture reservoir 106 and a top edge of the forward facing sidewall element 202. In a second embodiment, the opening may comprise a series of circular holes arranged in one or more sidewall element 202. Referring now to FIGS. 10 and 15, in another embodiment, the flexible geo-textile material may comprise an air and moisture permeable fabric suitably adapted to be breathable and allow for the transfer of air and/or moisture between the an interior of the container 1000 an ambient environment surrounding the container 1000.

Referring now to FIGS. 1-4, the water distribution unit 110 may allow water to be dispersed into the interior 104 on the container 102. The water distribution unit 100 may be configured in any suitable manner to receive and distribute water into the container 102. For example, in one embodiment, the water distribution unit 110 may comprise a lower well section 302 and a cover 304 suitably configured to be selectively coupled to the lower well section 302. The water distribution unit 110 may further comprise an opening 112 suitably configured to provide access to the lower well section 302, such as to allow water to be poured into the lower well section 302 while the cover 304 is coupled to the lower well section 302.

The water distribution unit 110 may be configured to be coupled to an upper section of a rear facing wall element 202 of the container 102 such that the water distribution unit 110 is disposed near a soil level of the open interior 104 of the container 102. In an alternative embodiment, the water distribution unit 110 may be formed integrally with the container 102 to form a unitary structure.

The water distribution unit 110 may also be configured to incorporate the mounting system. For example, the water distribution unit 110 may comprise a notched tab 402 along a rearward facing surface of the lower well section 302 that is suitably configured to couple to a wall fastener such as a partially extended screw or bolt. The water distribution unit 110 may further comprise a second tab 404 that is suitably configured to selectively couple to a mating tab 406 disposed along a rearward wall element 202 of the container 102.

Figure 5:
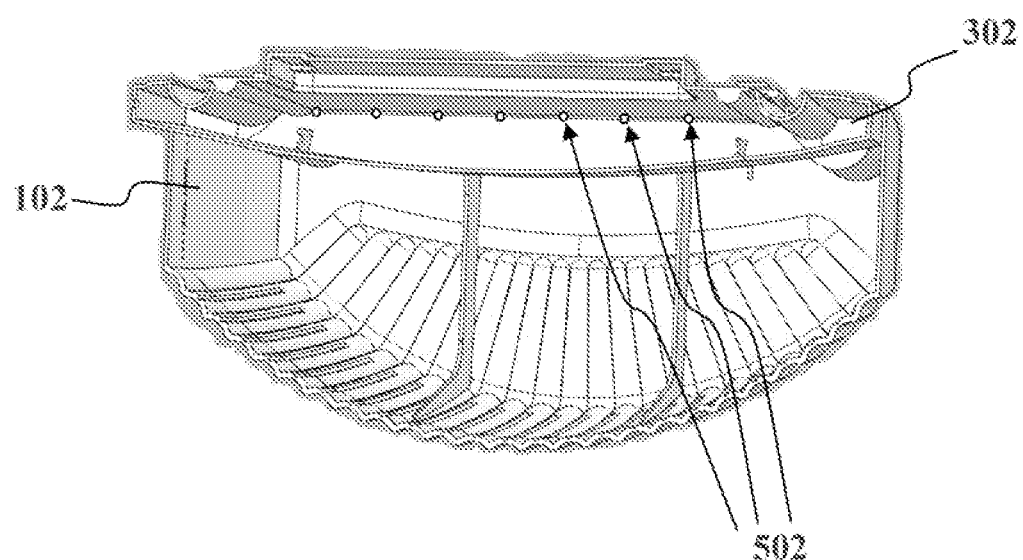
FIG. 5 representatively illustrates a top perspective view of the planter and the water dispersal unit in accordance with an exemplary embodiment of the present invention.

The lower well section 302 receives and distributes water into the open interior 104 of the container 102. The lower well section 302 may comprise any suitable system for dispersing water. For example, referring to FIG. 5, in one embodiment, the lower well section 302 may comprise a series of holes 502 disposed along a bottom surface of the lower well section 302. The holes 502 may be spaced such that water is equally dispersed along the soil surface to provide even watering. The holes 502 may also be positioned to distribute water along a rear wall of the container away from breathable zone 108 to reduce a potential for the water to run out the vertical slits 114 before reaching the reservoir 106.

The holes 502 may comprise any suitable size or shape to provide for controlled distribution of water. For example, the holes 502 may be sized to provide a desired flow rate of water into the open interior 104 such that the water may be readily absorbed into the soil without overflowing the top edges of the container 102. In another embodiment, the lower well section 302 may comprise a selector that allows for the holes 502 to be selectively opened or closed to adjust the rate of water flow into the open interior 104.

The container 102 and/or the water distribution unit 110 may also be configured to incorporate automatic watering systems such as drip irrigation systems. For example, in one embodiment, the rearward facing wall element 202 of the container 102 may comprise a recess 410 suitably configured to receive an irrigation line such as a flexible low pressure water line or a common PVC irrigation pipe. Similarly, the wafer distribution unit 110 may comprise a similar recessed area 408 that mates with the first recess 410 when the water distribution unit 110 is coupled to the container 102.

The water distribution unit 110 may be further configured to allow a drip line to pass from the recessed area 408 into an interior portion of the water distribution unit 110. For example, the water distribution unit 110 may comprise a drip line access point 208 suitably configured to allow a standard drip line, such as one-eighth inch or one-quarter inch, to pass into the interior portion of the water distribution unit 110. The water distribution unit 110 may be further be configured to secure the drip line within the interior of the water distribution unit 110. For example, an interior surface of the water distribution unit 110 may comprise a hook or tab adapted to couple to the drip line and secure it in place.

Referring now to FIGS. 8A and 8B, the embodiment of the vertically mountable flexible planter as illustrated in FIG. 6A includes a breathable, flexible, geo-textile material 808 such as recycled polyester needle-punched felt material. The material 808 is first cut into the desired pattern and laid flat on a planar surface. Extended portions or strips 802 can be provided to allow access to the pouch 606.

For example, the pouches 606 may be created by folding the material 808 back onto itself along a fold axis (shown in phantom in FIG. 8A) creating a pouch that is approximately two-thirds of the overall height of the plant hanger 600. To create the single plant hanger pouch 606 as illustratively shown in FIG. 6A, the lateral sides are stitched 604 and/or bonded vertically along the opposing side edges and the extended portions 802. The pouch 606 is formed between the opposing seams and the bottom portion of the overlapped folded material. Reinforcing stitching 608 can also be provided along the bottom and top edges of the pouch 606. Finally, a fastener 602, such as a grommet may be incorporated at the top of the seam to enable mounting or attachment to various types of vertical structures such as walls, fences and other structures.

Referring to FIGS. 9A and 9B, a flow diagram to fabricate the multi-pouch vertical plant hangers (e.g., triple and quintuple hanging planter pouches) includes a similar process cutting out the pattern, laying the pattern out flatly over a surface, folding over the front portion over the rear portion along a fold axis (shown in phantom in FIG. 9A) to form a single pouch, and then stitching and/or bonding the opposing ends from the bottom at the fold to the top of the material 708. Stitching and/or bonding 925 is also provided at intermediate areas along the material from bottom to the top of the material to illustratively form distributed (i.e., spaced) and independent plant pouches with all seams incorporating a fastener 602 at the top for mounting purposes. As illustratively shown in FIG. 9B, the pouches 606 are evenly spaced between the opposing ends, although such spacing is not limiting. Alternatively, partial intermediate stitching and/or bonding 915 can be provided so that adjacent pouches 606 are partially open to one another allowing the root systems between the individual plants to intermingle or they may be sewn completely top to bottom to separate the root systems from intermingling (e.g., FIG. 9B at 925). Although the pouches 606 of a multi-pouch hanger are illustratively shown as being equal in size (e.g., width), a person of ordinary skill in the art for which the present invention pertains will appreciate that the dimensions of the pouches can vary in size and shape therebetween. For example, some pouches 606 can be larger than others. Alternatively, the seams forming the pouches can be sloped instead of orthogonal with respect to the top and bottom edges of the hangers.

Referring now to FIGS. 7A-7C, the vertical mounted flexible planting system may further comprise a flexible, durable, impermeable, water retaining impermeable material 706 such as a recycled rubber, vinyl, or plastic. FIGS. 7A-7C depict five main structural elements; the breathable material 708 forming at least a portion of the front face of the hanging planter 700, an impermeable material 706 comprising the entire hack portion of the hanging planter 700, an optional impermeable material 606 backing located at the bottom 704 of the pouch 606, opposing seams 604 which define in part a plant pouch 606 therebetween, and the fasteners 602.

Although the vertical plant hangers of the present invention are illustratively described as using at least one fastener 602 as a mounting system for securing the planter in a vertical position relative to a horizontal, surface, a person of ordinary skill in the art will appreciate that other mounting systems or fasteners may be utilized. For example, hooks, bolts, loops, among other fasteners can readily be attached to the back panel for securing the hanging planter in a vertical position such as on a wall or from a ceiling.

Referring to FIGS. 10-13B, in an alternative embodiment, a vertically mountable 3-ply hanging planter 1000 having one or more pouches is illustratively shown. The 3-ply plant hanger 1000 embodiment differs from the 2-ply embodiment in that this latter embodiment includes the second interior layer 1006 and the first exterior layer 1002 that are both fabricated the geo textile material. Further, the water impermeable flexible material 1004 is inserted between at least a portion of the interior and exterior layers.

Figure 11A:
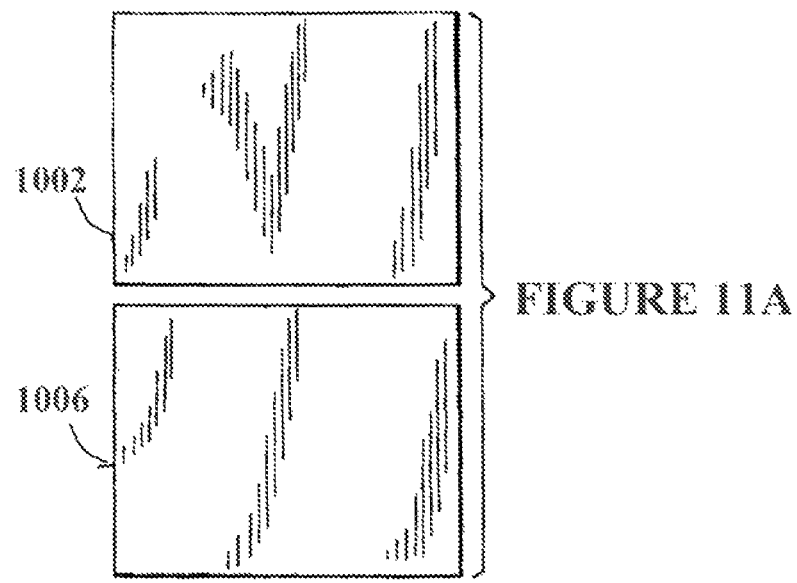
FIGS. 11A-11F depict a flow diagram of a method for fabricating the vertically mountable 3-ply hanging planter of FIG. 9.

Referring to FIG. 11A, a first exterior layer 1002 and a second interior layer 1006 are both cut to a matching predetermined size and shape. The width and height of the layers is determined based on the number of pouches being formed. For example, a hanging planter having a single pouch may have a width of 15 inches and a height of 12 inches, while a hanging planter having three pouches may have a width of 36 or 48 inches with a height of 12 or 15 inches.

Figure 11B:
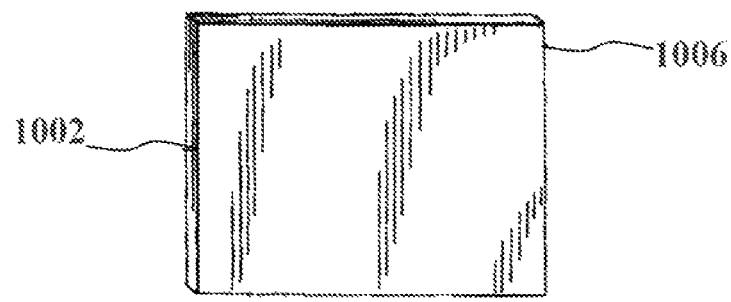
Figure 11C:
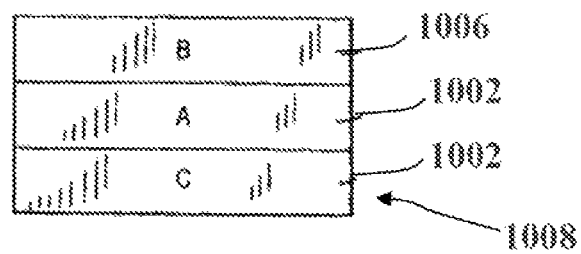

Referring to FIG. 11B, the second interior layer 1006 is placed adjacent to the first exterior layer 1002 and the edges thereof are fastened together on three sides with one side open to form a "pillow sham" like structure. The lateral and bottom adjacent edges of the two layers 1002 and 1006 may be sewn together and/or bonded using an industrial strength water impermeable sealant or adhesive. The edges may be sewn using a polyester thread having a predetermined size/weight such as Tex 30 to Tex 50. The two polyester needle-punched felt layers 1002 and 1006 are initially secured together along three sides or edges to form an opening on one edge, which allows for the insertion of the third impermeable interior layer 1004 therebetween. It is noted that a person of ordinary skill in the art will appreciate that a single elongated layer of the breathable material can alternatively be folded over and joined along the edges to form the pouch instead of the using the two separate layers 1002 and 1006.

A water-retaining portion or reservoir 1210 is formed at the bottom of the pouch by the opposing interior front and rear impermeable layers 1004. The height and width of the front portion of the impermeable lining layer 1004 defines the volume of the water-retaining portion, and an increase or decrease in the height can be used to define the volume of the reservoir 1210. The determination of the volume (e.g., height) of the reservoir 1210 can be based on environmental factors, such as the location (e.g., indoor or outdoor) of the hanging planter and climatic conditions. Illustratively, for wetter environments and/or outdoor use, the front portion of the impermeable lining layer 1004 can optionally be lower relative to the bottom of the planter 900 to reduce the water-retaining portion of the reservoir 1210 and thereby enable excess water (e.g., rainfall) to overflow and be dispersed through the felt material 1002, evaporate through the breathable felt material, or drip down to the ground below. For example, in wetter climates and outdoor use the height of the impermeable layer 1004 along the front of the planter 1000 can be in a range of zero to ⅕ of the overall height of the pouch, although such range is not limiting.

Alternatively, for use in hot and/or drier environments as well as indoors, the front portion of the impermeable lining layer 1004 can optionally be higher relative to the bottom of the pouch to increase the volume of the water-retaining portion 1210 in order to retain more of the water. For example, in drier climates or for indoor use and where relative humidity is low, the height of the impermeable lining layer 1004 along the front of the planter 1000 can be in a range of ⅕ to ⅓ of the overall height of the pouch, although such range is not considered limiting. A person of ordinary skill in the art will appreciate that the height of the impermeable material can be configured to adjust the size of the reservoir according to local environmental conditions and usage for any of the hanging planter embodiments described and shown herein. Advantageously, the impermeable lining layer (barrier) 1004 helps conserve water and keep the soil's nutrients and/or fertilizer in the pouches.

Further, the interior breathable layer 1006 can serve as a wick to draw water from the water-retaining portion 1210 upward into the soil and to the plant roots to thereby continuously provide water and nutrients to the plants. Moreover, any excess water that may collect in the pouches, illustratively from rain or overwatering, is quickly drawn from the reservoir 1210 by the interior breathable layer 1006 to portions of the breathable material 1002 that are not positioned adjacent to the impermeable lining layer 1004, and to thereby enhance evaporation of the excess water and prevent root rot. In this manner, the wicking action of the interior breathable layer 1006 eliminates the need for providing drainage holes in the bottom of the vertical hanging planter 1000.

Referring to FIGS. 14 and 15, the vertical hanging planter 1000 may be formed from a single sheet of the breathable felt material that is folded over itself at the bottom to form a rear panel 1008, a front panel 1002 and the pouch portion 1404 defined therebetween in a similar manner as described above with respect to FIGS. 6A-7C. The water-impermeable lining 1004 may be positioned along the interior of the pouch 1304 and extend from proximate the top portion of the planter 1000 and downward toward at least the bottom interior portion of the pouch 1404, as shown in FIG. 14. The water-impermeable lining 1004 may extend approximately the same width of the pouch 1404, although a person of ordinary skill in the art will appreciate that the water-impermeable lining 1004 can have a smaller width than the width of the pouch 1404. Further, since the front portion of the pouch 1404 is formed by the breathable felt material, the soil can be aerated through the felt material which helps prevent the plants from becoming root bound.

Alternatively, the water-impermeable lining 1004 continues along the bottom interior portion and is folded or curves upward along the interior front wall forming the pouch 1404. In one embodiment, the water-impermeable lining 1004 defines the water-retaining portion or reservoir 1210, which can advantageously be used to retain additional water in arid environments, as discussed above.

A tongue or front lining 1006 fabricated from the breathable felt material 1002 is positioned adjacent to and over the interior water-impermeable lining 1004 and extends from the top of the planter 1000 downward to, proximate the bottom portion of the pouch 1404. The length of the front lining 1006 may be at least sufficient to extend below the top surface of the soil. For example, the front lining 1006 may extend the width of the pouch 1404 and cover the upper and mid-portions of the interior water-impermeable lining 1004, although the width of the front lining 1006 is not limiting. Referring now to FIGS. 14 and 15, the front lining 1006 is formed from the same simile sheet of breathable felt material and folded over the water-impermeable lining 1004. Alternatively, the front lining 1006 can be fabricated from a separate sheet of breathable felt material. The front lining 1006 may be used to wick or draw water to or from the soil or the reservoir 1210 to help provide moisture to the roots of the plants, as well as wick away any excess water in the reservoir 1210 to help prevent root rot, as described above.

Referring now to FIG. 10, the third impermeable interior layer 1004 may be cut to a slightly less width than the first exterior layer 1002 and the second interior layer 1006. In this manner, the third impermeable interior layer 1004 may be inserted into the opening of the pillow sham configuration of the two layers. Furthermore, the impermeable interior layer 1004 may not be visible to a viewer.

In one embodiment, the height of the third impermeable interior layer 1004 is less than the height of the first exterior layer 1002 and the second interior layer 1006. The height of the third impermeable interior layer 1004 may be approximately two-thirds of the height of the first exterior layer 1002 and the second interior layer 1006, although such height is not limiting. In this manner, two-thirds of the two breathable first and second layers 1002 and 1006 are separated from each other, and this portion of the plant hanger is no longer breathable in terms of allowing moisture to escape therethrough. However, one-third interior of the plant hanger remains breathable, and thereby allows for the passage of moisture.

Referring again to FIG. 10, the third impermeable interior layer 1004 may be positioned along the rear bottom and lower front portions of the plant hanger 1000. The upper front side of the plant hanger does not have the impermeable interior layer 1004 inserted between the first exterior and second interior layers 1002 and 1006. Accordingly, water and moisture cannot permeate or seep out of the hanging planter in the areas where the impermeable layer 1004 is located. Rather, the water and moisture can only permeate through the front side portion of the hanging planter where the impermeable layer 1004 is not present.

Figure 11D:
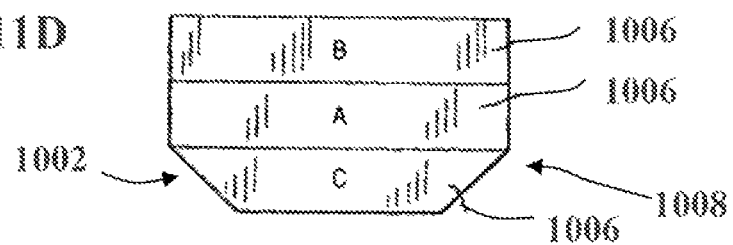
Figure 11E:
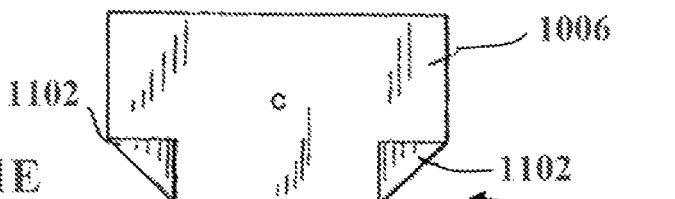

Referring to FIG. 11D, the lower corners 1102 of the lower front panel can be folded backwards to form a triangle, as shown by the rear view of the hanging planter 1000 in FIG. 11E. The triangular "tabs" 1102 are fastened to the rear portion by sewing and/or bonding them in a similar manner described above. The triangular tabs are formed and secured to the rear portion to prevent excessive leakage from the lower corners, strengthen the bottom of the plant hanger, and for aesthetic purposes.

Figure 11F:
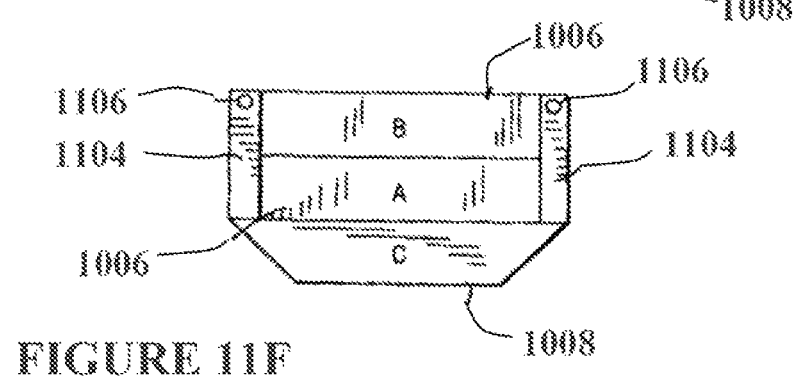
Figure 12:
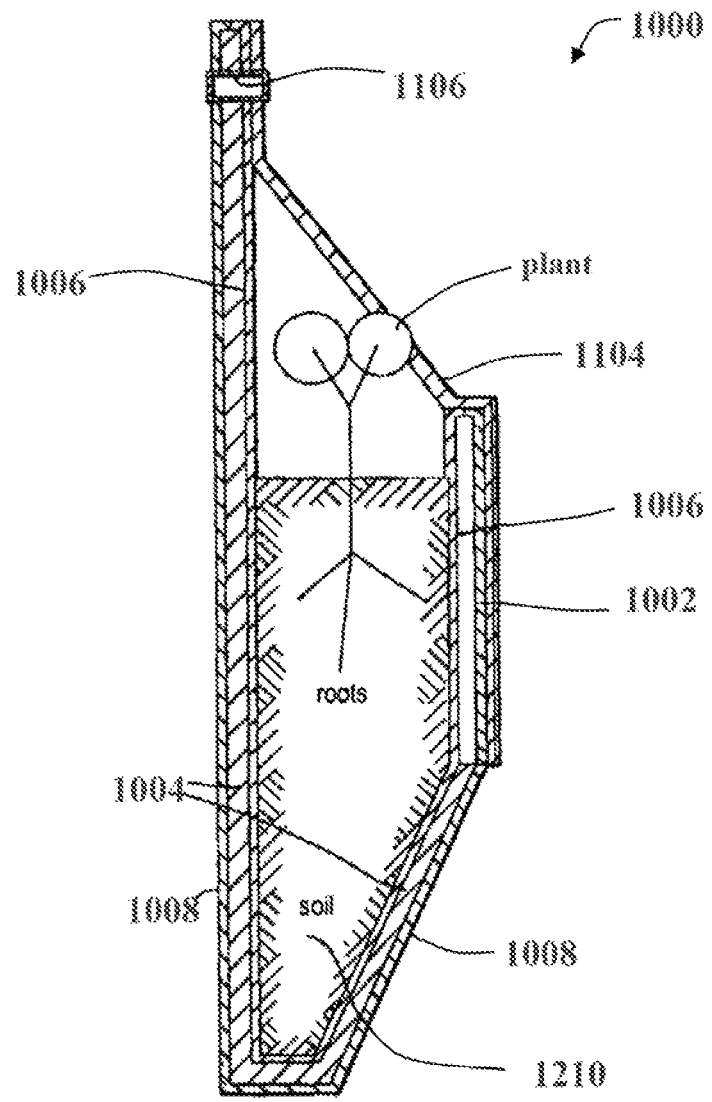
FIG. 12 is a cross-sectional view of the vertically mountable 3-ply hanging planter after completion of the fabrication method of FIGS. 10A-10F.

Referring to FIGS. 11F and 12, an edge reinforcement layer 1104 is attached to each opposing side of the plant hanger. The edge reinforcement layers 1104 are fabricated from the breathable material, such as the polyester needle-punched felt material, and are fastened by stitching and/or an adhesive in a similar manner as described above. The edge layers 1104 provide structural reinforcement to the edges of the plant hanger. Although the pair of edge layers 1104 are illustratively shown on the front side of the plant hanger, a person of ordinary skill in the art will appreciate that the pair of edge layers 1104 can also be provided on the rear side of the hanging planter or folded over the sides of the hanging planter to provide structural reinforcement on both the front and rear edges of the hanger 1000.

Figure 13A:
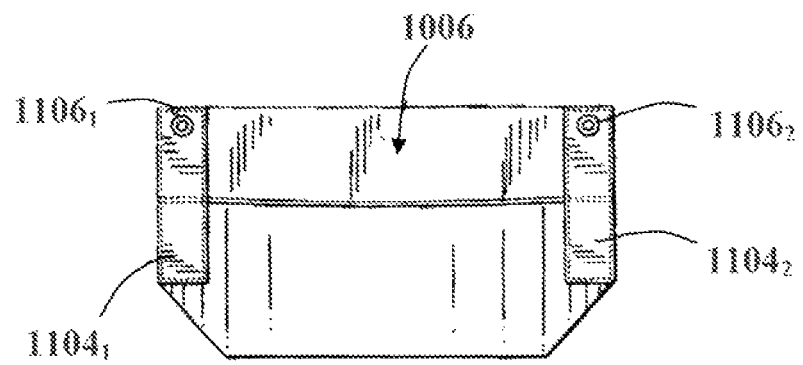
FIGS. 13A and 13B are front perspective views illustrating the vertically mountable 3-ply hanging planter having a single pouch and the vertically mountable 3-ply hanging planter having multiple pouches fabricated in accordance with the method of FIGS. 11A-11F.
Figure 13B:
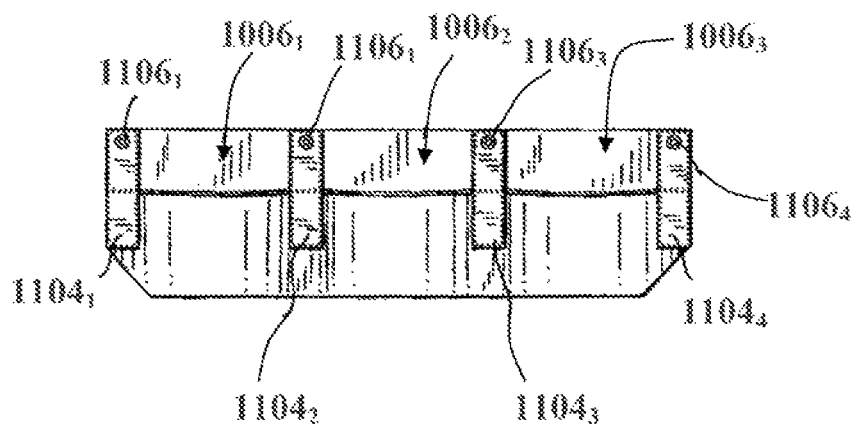

Referring to FIG. 13A, a hanging planter having a single pouch is shown filled with soil. FIG. 13B illustrates a hanging planter having multiple pouches (e.g., three pouches). In this multiple-pouch embodiment, additional reinforcement layers 1104 and grommets 1106 are provided at the lateral ends of each pouch. For example, in FIG. 13B, the first pouch 1006₁ has reinforcement layers 1104₁ and 1104₂ positioned at its opposing ends, the second pouch 1016₂ has reinforcement layers 1104₂ and 1104₃ positioned at its opposing ends, and the third pouch 1006₃ has reinforcement layers 1104₃ and 1104₄ positioned at its opposing ends. Similarly, the first pouch 1006₁ has fasteners 1106₁ and 1106₂ positioned at its opposing top corners, the second pouch 1006₂ has fasteners 1106₂ and 1106₃ positioned at its opposing top corners, and the third pouch 1006₃ has fasteners 1106₃ and 1106₄ positioned at its opposing top corners.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A vertical hanging planter, comprising:
   a plant receiving unit having a base and a plurality of connected sidewall elements disposed along peripheral edges of the base and extending upwardly therefrom to define an interior section of the plant receiving unit, comprising:
   a forward facing sidewall element;
   a solid moisture impermeable flat rearward facing sidewall element extending between a lower portion and an upper portion;
   a moisture reservoir disposed along a lower portion of the interior section of the plant receiving unit; and
   a moisture permeable zone positioned within the interior section of the plant receiving unit and extending upwardly from the moisture reservoir, wherein the moisture permeable zone is configured to allow moisture to exit the interior section of the plant receiving unit, wherein the moisture permeable zone is defined by a plurality of openings passing between an inner surface and an exterior surface of the forward facing sidewall element; and a water distribution unit configured to selectively couple to the flat rearward facing sidewall element and positioned substantially above the interior section of the plant receiving unit, wherein the water distribution unit is configured to receive and evenly disperse water into the interior section of the plant receiving unit and comprises a lower well section comprising: an open topped water receiving section; and a water dispersing section disposed along a bottom portion of the water receiving section; and a cover configured to selectively couple to the lower well section and substantially cover the water receiving section:
- a mounting system disposed along a rear facing section of the water distribution unit and configured to selectively couple the water distribution unit to a vertical surface; and
- a pair of tabs positioned on the rear facing section of the water distribution unit and configured to couple to a pair of mating tabs on the solid moisture impermeable flat rearward facing sidewall element.

2. A planter according to claim 1, wherein the plurality of openings comprises a series of holes arranged from a first end to a second end of the forward facing sidewall element and extending between the moisture reservoir and a top edge of the forward facing sidewall element.

3. A planter according to claim 1, wherein the water distribution unit and the plant receiving unit form a recess extending along a rear facing exterior surface of the flat rearward facing sidewall element of the planter when the water distribution unit is coupled to the container.

4. A vertical hanging planter according to claim 1, wherein the plurality of openings comprises a series of vertical slits arranged from a first end to a second end of the forward facing sidewall element and extending upwards from the moisture reservoir to an upper portion of the forward facing sidewall element.

5. A vertical hanging planter according to claim 1, the water distribution unit comprises an opening configured to provide access to the open topped water receiving section while the cover is coupled to the lower well section.

* * * * *